(12) United States Patent
Sidlinger et al.

(10) Patent No.: US 6,891,128 B1
(45) Date of Patent: May 10, 2005

(54) ROTATIONAL FLASH GUARD AND METHOD OF USE

(75) Inventors: Matthew R. Sidlinger, Clinton, IA (US); Jan C. Mangelsen, Charlotte, IA (US); Alan M. Deitering, Bancroft, IA (US); Michael P. Skahill, Pleasant Valley, IA (US); Jason J. Kelsick, Bettendorf, IA (US)

(73) Assignee: Genesis Systems Group, LLC., Davenport, IA (US)

( * ) Notice: Subject to any disclaimer, the term of this patent is extended or adjusted under 35 U.S.C. 154(b) by 126 days.

(21) Appl. No.: 10/445,780

(22) Filed: May 27, 2003

(51) Int. Cl.⁷ ............................................. B23K 37/00
(52) U.S. Cl. .................................. 219/137.43; 228/21
(58) Field of Search ......................... 219/137.43, 158; 228/21, 214, 215, 39, 59; 160/368.1, 368.2, 160/369; 266/903; 74/608, 609, 612–617

(56) References Cited

U.S. PATENT DOCUMENTS 6,036,082 A * 3/2000 Caldarone ................... 228/212
6,161,590 A * 12/2000 Wulff .......................... 138/110
6,248,977 B1 * 6/2001 Bessler et al. ......... 219/137.43
6,282,847 B1 * 9/2001 Mangelsen et al. .......... 52/36.1

FOREIGN PATENT DOCUMENTS

| EP | 0 528 667 A1 | * | 2/1993 |
| JP | 02015880 A | * | 1/1990 |
| JP | 06182552 A | * | 7/1994 |
| JP | 07303969 A | * | 11/1995 |

* cited by examiner

Primary Examiner—Kiley S. Stoner
Assistant Examiner—Kevin McHenry
(74) Attorney, Agent, or Firm—McKee, Voorhees & Sease, P.L.C.

(57) ABSTRACT

The invention relates to a rotational flash guard and method of use of a rotational flash guard. In general, the flash guard is attached to a support frame by an arm, a linkage mechanism pivotally interconnects the arm and the support frame, and an extensible power member connects the support frame to the linkage mechanism. Due to the unique configuration of the rotational flash guard it is adapted for movement about a work piece positioner to allow for use of a robotic tool while providing protection to the operator and other workers.

14 Claims, 9 Drawing Sheets

ROTATIONAL FLASH GUARD AND METHOD OF USE

BACKGROUND OF THE INVENTION

The present invention relates generally to a flash barrier system, and specifically to a rotational flash guard and method of use. An operator utilizes the rotational flash guard as flash protection for the operator and the workers that would be passing by a robot when a robot is working. When the robot is finished working the rotational flash guard is then moved such that an operator may then interact with the piece that was being worked on by the robot.

The invention specifically improves upon traditional robotic workstations currently employed by those in the prior art. Although workstations may have some flash protection they typically do not have sufficient flash protection for the operators or workers. Traditional workstations often require additional protection supplied by an end-user as opposed to supplied by a manufacturer.

Several problems occur in the traditional positioner design utilizing flash protection. For example, flash protection areas may need to be manually moved into position after a work piece is put into a position for work upon by a robot. This is both time consuming for an operator and inefficient.

Another problem with traditional flash guard shielding is that when employing a robot used between two work stations, the flashing from a first workstation would flash to the second workstation. Thus even if a operator was to try to disengage a work piece from a work piece holder in a first workstation, the work piece in the second workstation could not be worked upon by the robot.

It is therefore a primary objective of the present invention to provide a flash guard that may be mechanically positioned from a loading station to a working station.

A further objective of the present invention is to provide a rotational flash guard that may be rotated from a loading station to a guarding station such that when the flash guard is in the loading station the flash guard is protecting a user from flashing that may be coming from a robot operating in the second workstation.

A further objective of the present invention is to provide a device which is easy to use and economical to manufacture.

A further objective of the present invention is to provide a rotational flash guard which provides continuous protection by the flash guard as the flash guard hangs perpendicular to the floor.

A still further object of the present invention is to provide a new, safe design.

A still further objective of the present invention is to provide a rotational flash guard design that provides protection for both the operator loading or unloading parts and other workers passing by.

A still further objective of the present invention is to allow for use of an overhead lift assist.

A still further objective of the present invention is to eliminate the need for additional flash protection supplied by the end user.

The means and method of accomplishing these and other objectives will become apparent in the following description of the invention.

BRIEF SUMMARY OF THE INVENTION

The foregoing objectives may be achieved by a workstation having a support frame and a flash guard. The workstation also has an arm supporting the flash guard and is pivotally mounted to the support frame for pivotal movement about an arm axis from a first position to a second position. The workstation also includes a linkage mechanism pivotally interconnecting the arm and the support frame and an extensible power member connected to the support frame and to the linkage mechanism. The power member of the workstation is movable from a retracted position holding the arm in the first position to an extended position for moving the arm to the second position.

The foregoing objectives may also be achieved by a workstation having a support frame, an arm assembly comprising first and second spaced apart arms and a cross bar extending between the arms, and a flash guard sheet member detachably connected to the cross bar. The workstation also includes a first work piece holder on the support frame. The workstation also has a robot mounted on the support frame adjacent the first work piece holder.

The foregoing objectives may still further be achieved by a method of providing a flash guard. The method includes the step of attaching a first flash sheet member to a first arm assembly pivotally mounted to a support frame. The method also includes the step of pivoting the arm assembly from a first position wherein the flash guard sheet member is on a first side of a first work piece holder to a second position wherein the flash guard sheet member is on a second side of the work piece holder opposite from the first side.

DETAILED DESCRIPTION OF THE PREFERRED EMBODIMENT

Figure 1:
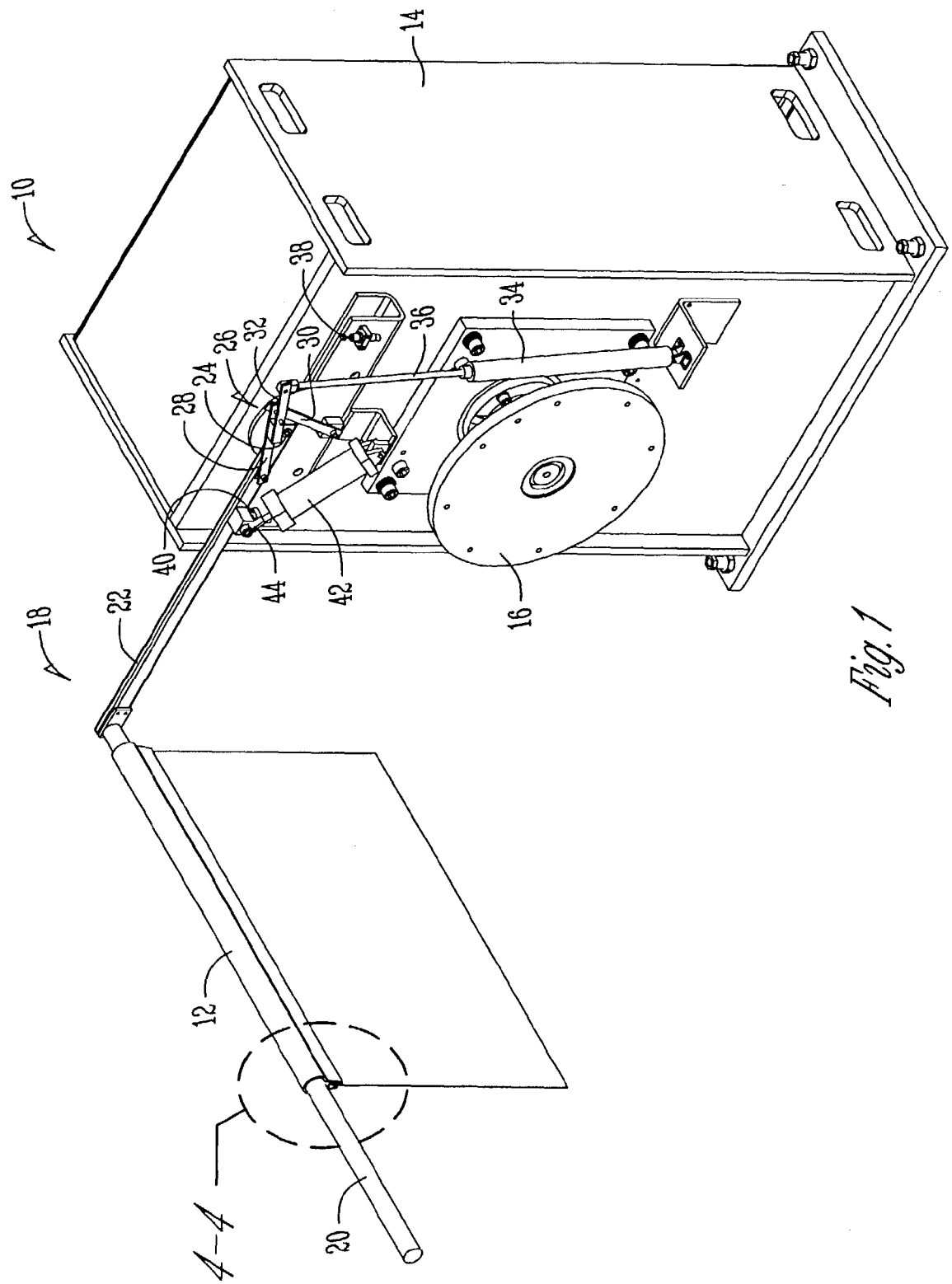
FIG. 1 is a perspective view of a workstation with an extensible power member in a second position.

Referring to the drawings, numeral 10 generally refers to a rotational flash guard or workstation and numeral 12 refers to the flash guard.

The workstation 10, as seen in FIG. 1, has a support frame 14. The support frame 14 is capable of supporting the weight of a workpiece holder 16, a work piece (not shown), a pivotal arm assembly or arm assembly 18, and a flash guard 12.

The arm assembly 18 is made up of a flash guard boom or cross arm 20 and arm 22. The arm assembly 18 is attached to the support frame 14 at pivot point 24. The arm can rotate about the pivot point 24 slightly over 180°.

A linkage mechanism 26 pivotally interconnects the arm 22 to the support frame 14.

The linkage mechanism 26 has a first link 28, second link 30, and a third link 32. The first link 28 is pivotally connected to the arm 22. The second link 30 is pivotally connected to the support frame 14. The third link 32 is connected to an extensible power member 34. The linkage mechanism 26 is designed to allow for slightly over 180° of arm 22 movement from extensible power member 34.

The extensible power member 34 may be a pneumatic cylinder. Alternatively, the extensible power member 34 may be a hydraulic cylinder.

Extensible power member 34 is attached to support structure 14. When extensible power member 34 is enabled a push rod 36 extends from extensible power member 34. In this state extensible power member 34 pushes linkage mechanism 26 rotating arm assembly 18 to a second position or loading position, as seen in FIG. 1. When extensible power member 34 retracts push rod 36, the push rod 36 pulls the linkage mechanism 26 rotating the arm assembly 18 and places the flash guard 12 into a first position or guarding position, as seen in FIG. 3.

In operation, the extensible power member 34 may begin at the loading position, as seen in FIG. 1. The extensible power member 34 is fully extended and the linkage mechanism 26 connects the extensible power member 34 to the arm 18 of the arm assembly 18. The first link 28 of the linkage mechanism 26 is pivotally attached at one end to the arm and at the other end pivotally connected to the second link 30. The first link 28 is also attached at an intermediate location to the third link 32.

Figure 2:
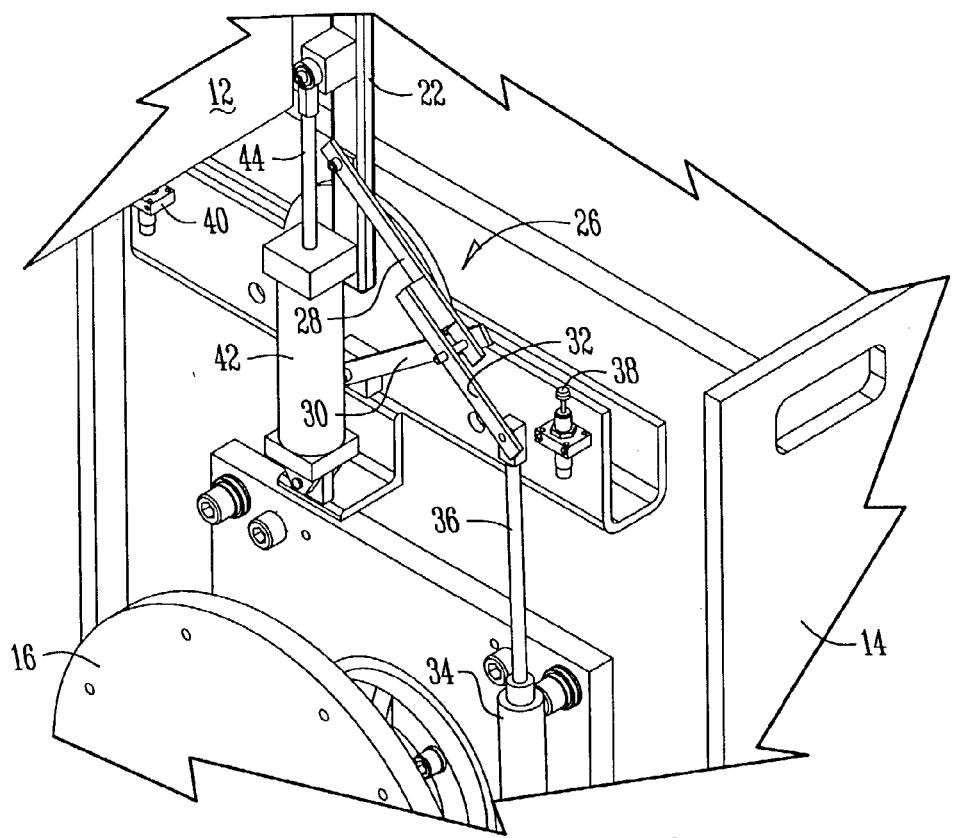
FIG. 2 is an enlarged perspective view of a workstation with the extensible power member in an upright position.

When the extensible power member 34 is engaged, the extensible power member 34 exerts force upon the linkage mechanism 26 and begins moving from the loading position to the upright position, as seen in FIG. 2. The links 28, 30 and 32 respond to this motion. The third link 32, attached to the rod 36, responds by its end attached to the rod 36 moving towards the extensible power member 34. The first member 28 attached to the third member 32 and pivotally attached to the arm 22, responds by its end attached to the arm 22 following along an arch matching the rotation of the arm 22. The second link 30 attached to the support frame and pivotally attached to the first link 28 and the third link 32, responds by rotating to maintain the second link 30 as a fulcrum.

Figure 3:
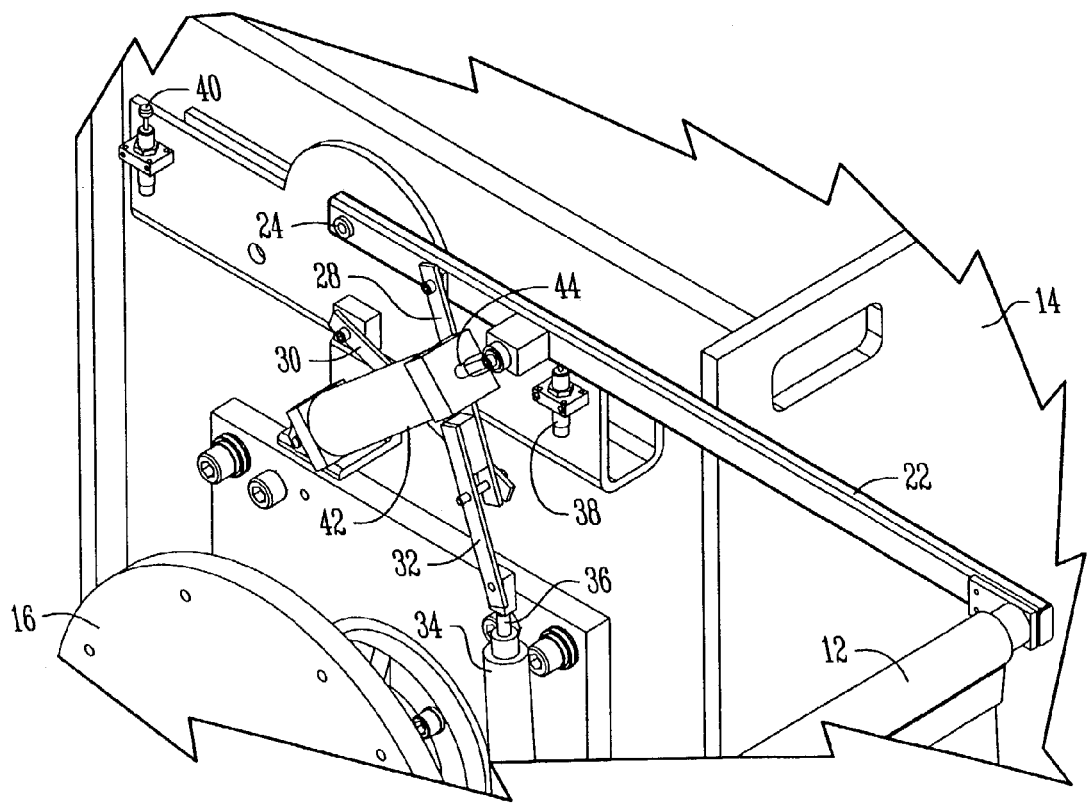
FIG. 3 is an enlarged perspective view of a workstation with the extensible power member in a guarding position or first position.

The extensible power member 34 continues to retract as the flash guard 12 moves from the upright position to the guarding position, as seen in FIG. 3. The third link 32 responds by its end attached to the rod 36 moving towards the extensible power member 34. The first link 28 responds by its end attached to the arm 22 following along an arch matching the rotation of the arm. The second link 30 responds by maintaining the first link 28 and third link 32 combination supported without a fulcrum by the extensible power member 34.

For movement of the flash guard 12 in the opposite direction, the extensible power member 34 begins at the guarding position, as seen in FIG. 3, moves the flash guard 12 to the upright position by translating force through the first link 28 and third link 32 combination. The first link 28 and third link 32 combination begins at a slight angle to the extensible power member 34 which becomes pronounced as the flash guard 12 approaches the upright position, as seen in FIG. 2. As the flash guard 12 begins to be lowered into the loading position, the second link 30 begins to act as a fulcrum and the weight of the flash guard 12 being counteracted by the extensible power member 34 until it comes to rest, as seen in FIG. 1.

The rotation of flash guard 12 about pivot point 24 utilizes a first arm resting surface 38 and a second arm resting surface 40. When the extensible power member 34 has a fully extended push rod 36 the arm assembly 18 is in a guarding position and rests upon a second arm resting surface 40. When the extensible power member 34 has the push rod 36 in a retracted position, the arm assembly 18 is in a loading position and rests upon first arm resting surface 38. The resting surfaces 38, 40 have a shock absorber and a bracket attached to support frame 14.

A balancing mechanism 42 is connected to the support frame 14 and the arm 22. The balancing mechanism 42 may be a pneumatic cylinder. Alternatively, the balancing mechanism 42 may be a hydraulic cylinder. The balancing mechanism 42 acts as a counterweight to balance the flash guard 12 and arm assembly 18 as it rotates about pivot point 24. During rotation, a balancing mechanism rod 44 extends and retracts to maintain force upon the arm 22.

As the flash guard 12 is moving from the loading position seen in FIG. 1, to the upright position seen in FIG. 2, the balancing mechanism 42 pivots at the end attached to the arm 22 and the rod 44 extends to follow the radial movement of the arm 22. The extension to the upright position may be assisted by supply media supplied to a port on the balancing mechanism 42. As the flash guard 12 is moving from the upright position to the guarding position, as seen in FIG. 3, the supply media may be exhausted from a port on the balancing mechanism 42 operating as a regulator. In reverse, as the flash guard 12 is moving from the guarding position to the upright position, supply media may be supplied to a port on the balancing mechanism 42 which can then be exhausted as the flash guard 12 moves to the loading position.

Figure 4:
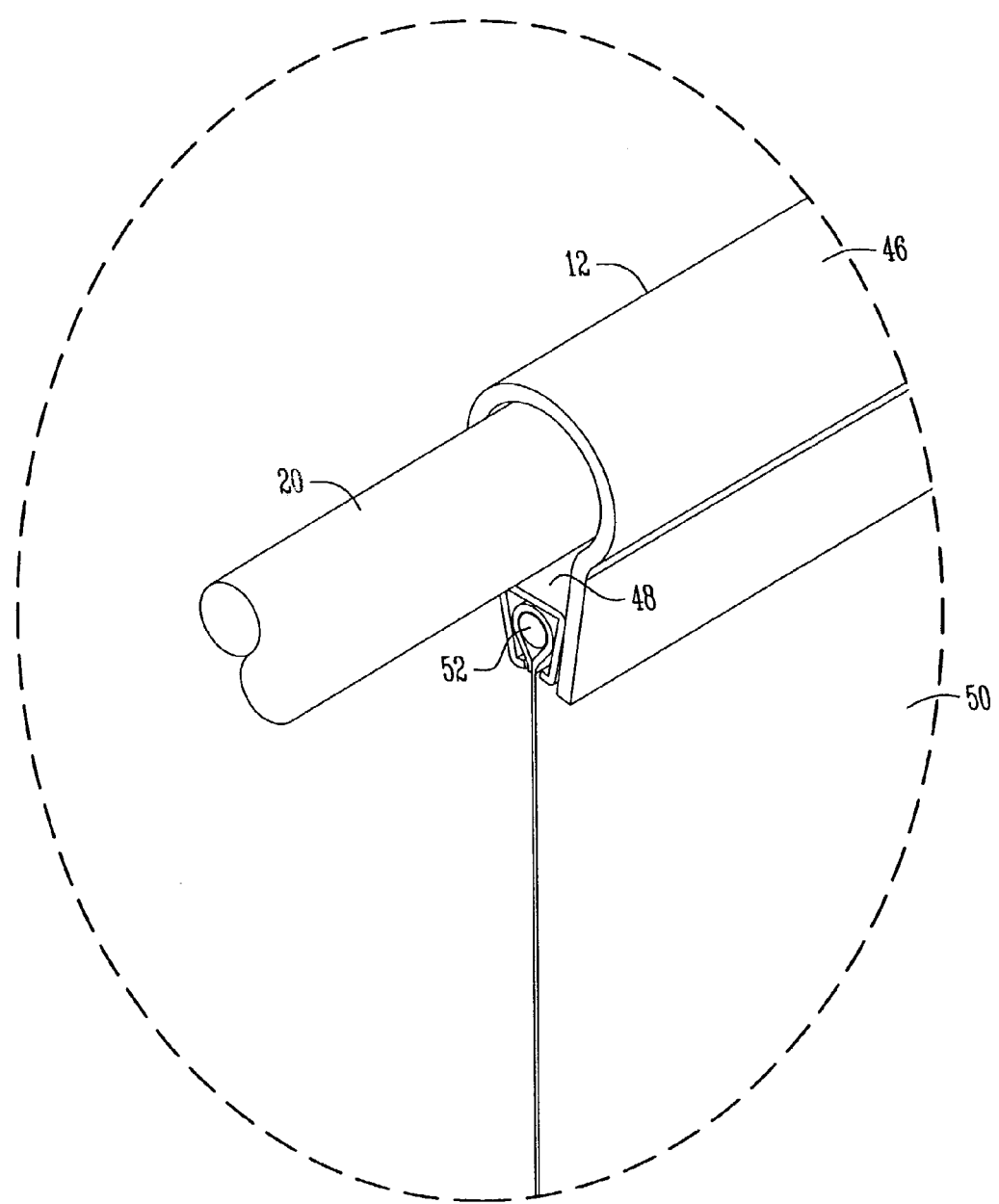
FIG. 4 is an enlarged view of the workstation of FIG. 1.

As seen in FIG. 4, the flash guard 12 is fitted to the boom or cross bar 20. A flash guard connector 46 is in a conforming relationship with the boom 20 which allows for rotational movement of the flash guard connector 46 about the boom 20. The flash guard connector 46 is formed of high density polyethylene.

The clip 48 is attached to flash guard connector 46. Inserted into the clip 48 is a flash barrier or flash guard sheet member 50. The flash guard sheet member 50 is fashioned out of a reinforced fabric.

The flash barrier 50 is fashioned with barrier rod 52 to allow for insertion into clip 48.

Figure 5:
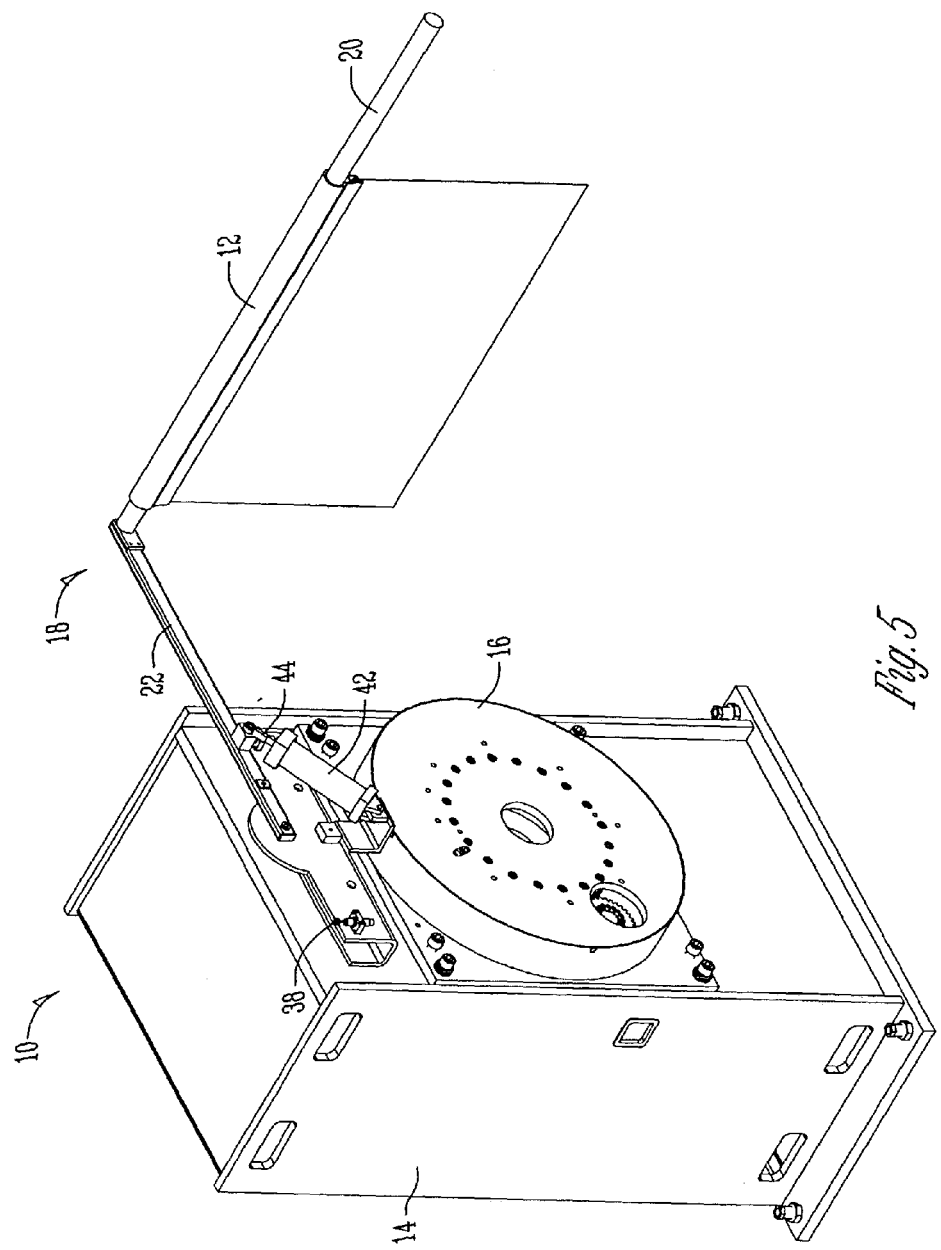
FIG. 5 is a perspective view of a workstation without an extensible power member in a loading position or second position.

FIG. 5 shows an embodiment of the rotational flash guard or workstation 10 without the linkage member 26 or the extensible power member 34. This workstation uses the second arm assembly 18 for supporting the flash guard 12 with the second arm 18 pivotally connected to the support frame 14 for movement between a first and second position. This workstation 10 may also have a second balancing mechanism 42 connected to the support frame 14 and to the second arm 22.

Alternatively, the workstation 10 may be a stand alone unit that moves between a first and second position without an extensible power member 34.

Figure 6:
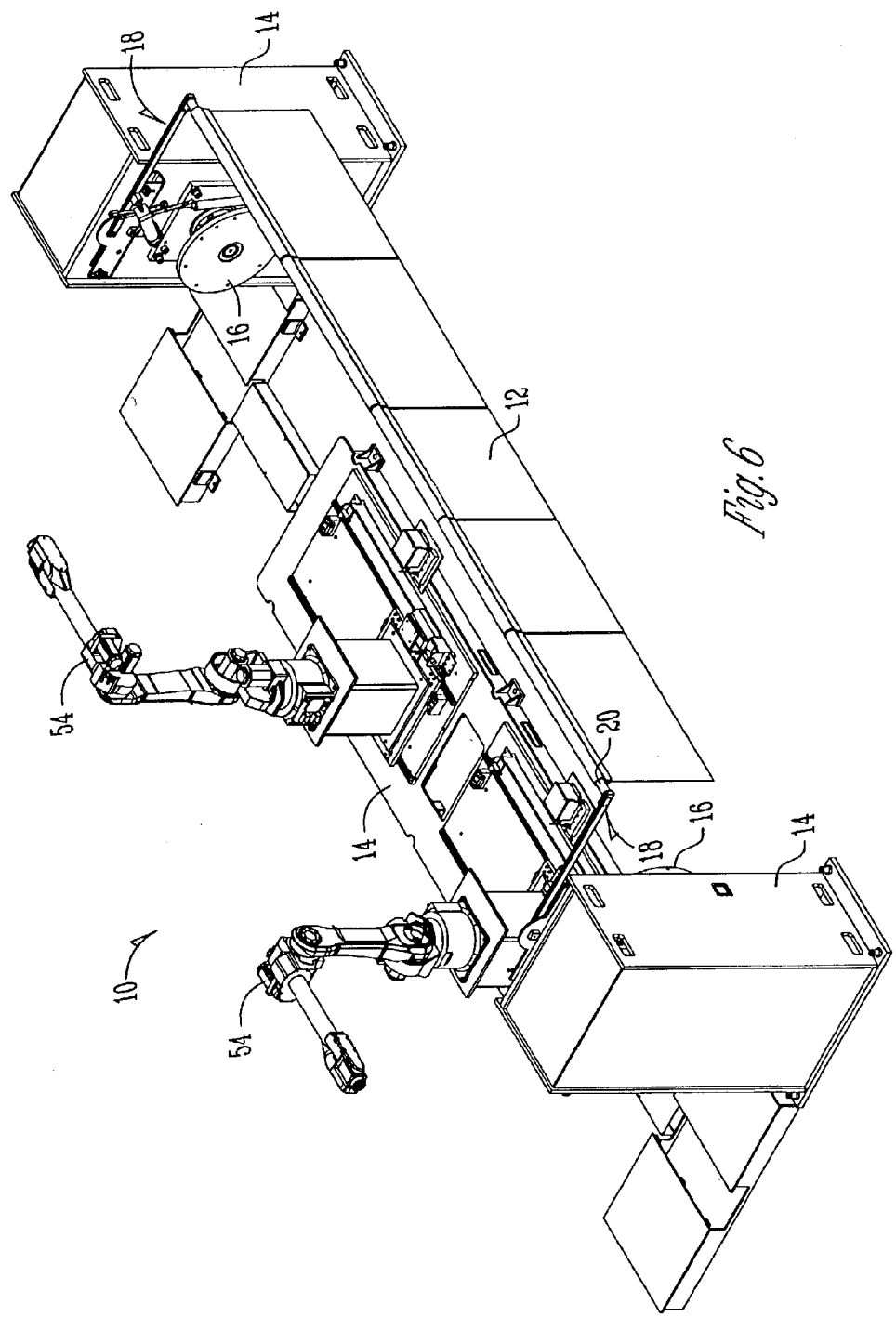
FIG. 6 is a perspective view of a workstation in a guarding position or first position.
Figure 7:
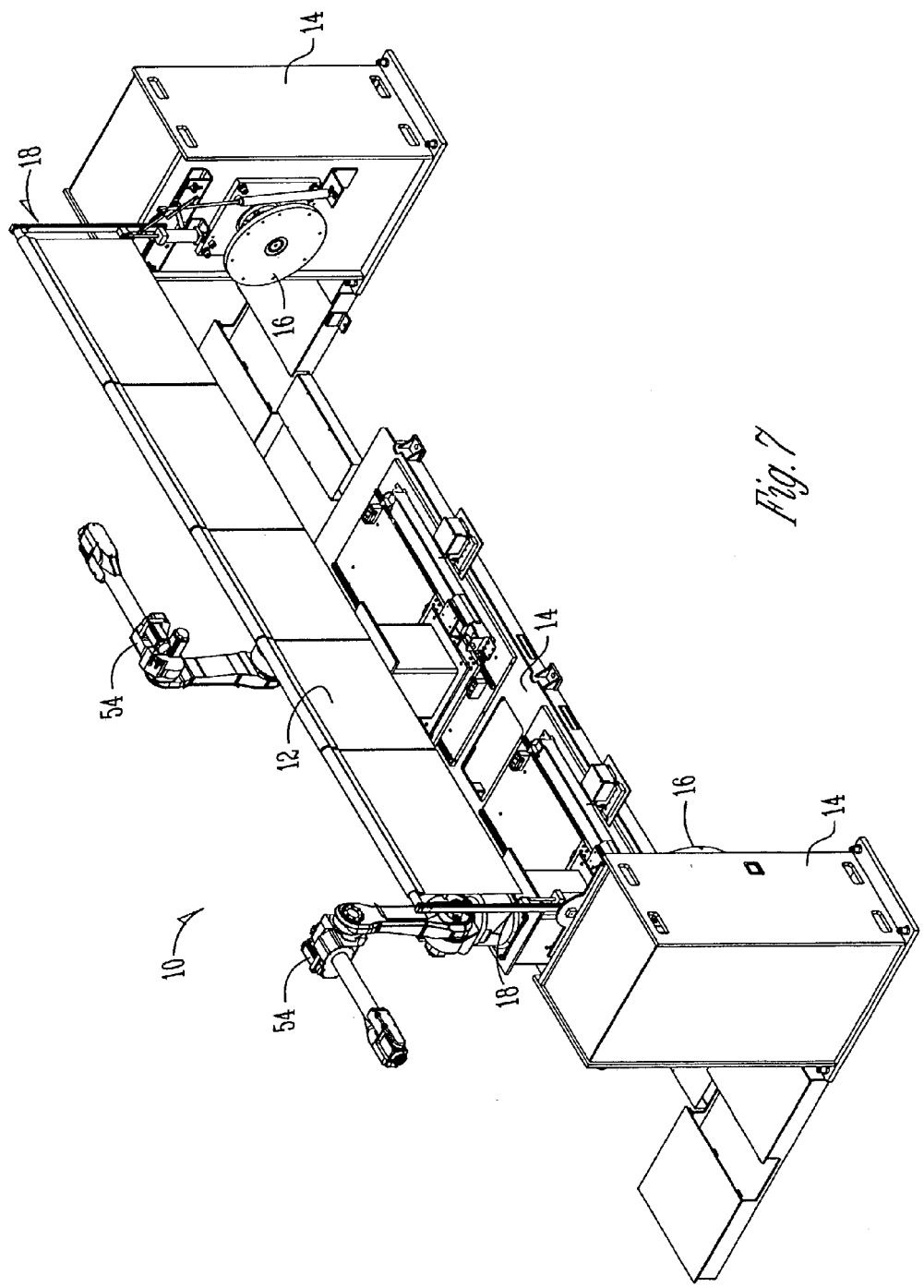
FIG. 7 is a perspective view of a workstation in an upright position.
Figure 8:
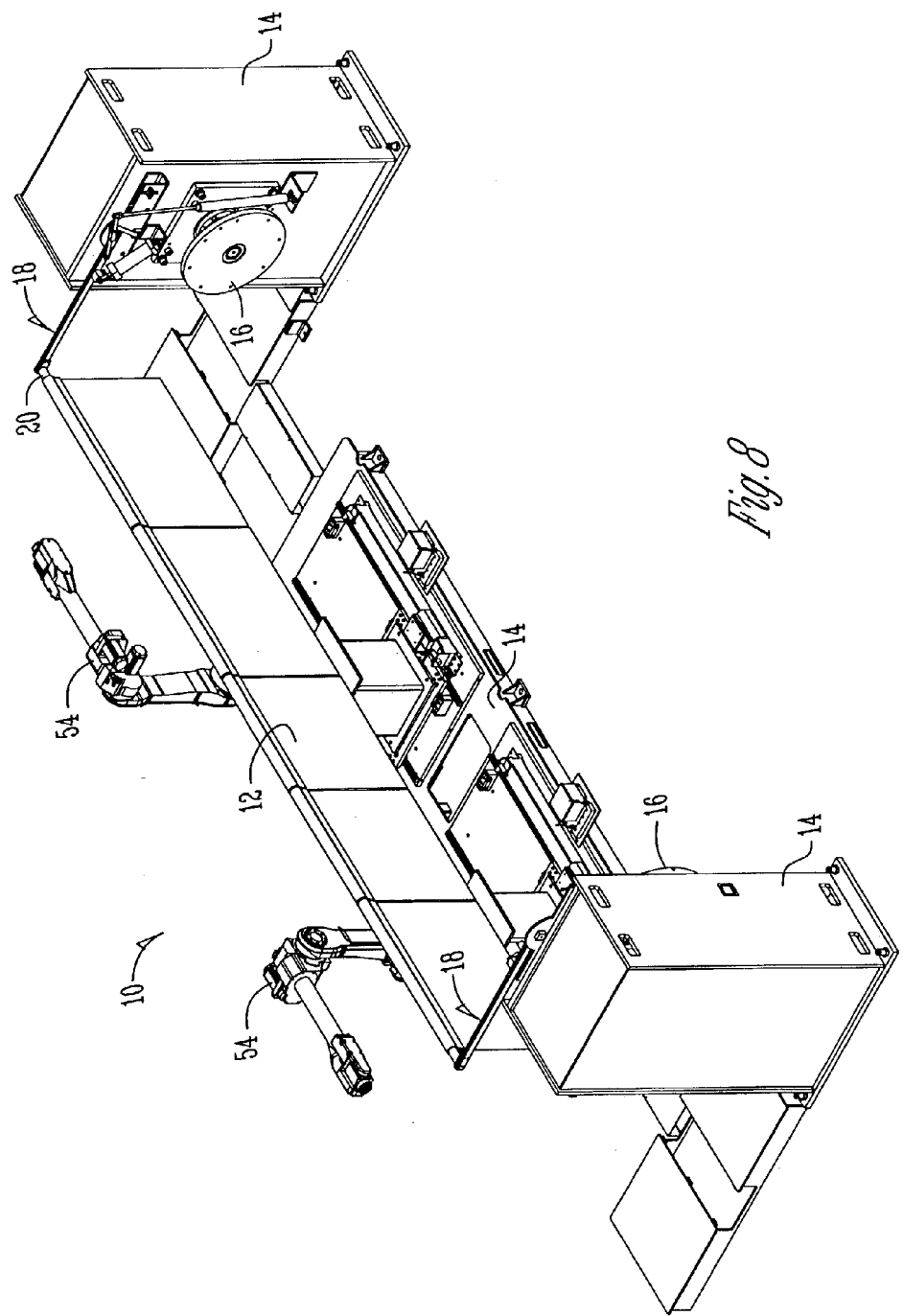
FIG. 8 is a perspective view of a workstation in a loading position or second position.

As seen in FIGS. 6, 7, and 8, an embodiment of the rotational flash guard or workstation 10 has the support frame 14, the pivotal arm assembly with first and second spaced apart arms 18 and a cross bar 20 extending between. The flash guard 12 is detachably connected to the cross bar 20. The workstation 10 also has a robot 54 mounted on the support frame 14 adjacent the first work piece holder 16.

FIG. 7 and FIG. 8 are provided to illustrate the position of the arm assembly in a first position as seen in FIG. 6, in an upright position as seen in FIG. 7, and in a second position as seen in FIG. 8.

Figure 9:
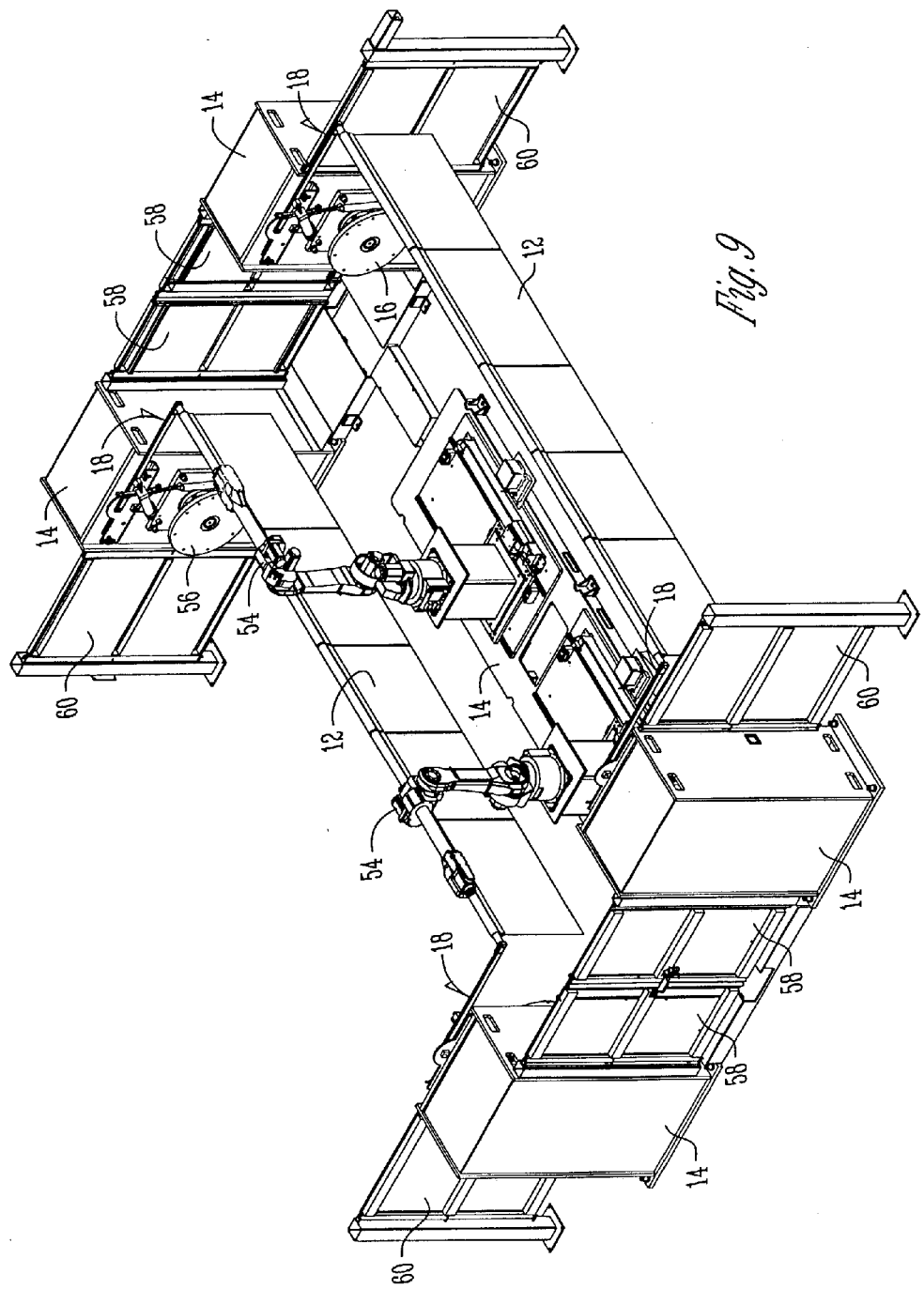
FIG. 9 is a perspective view of a workstation with a first workpiece holder between a first and second flash guard.
Figure 10:
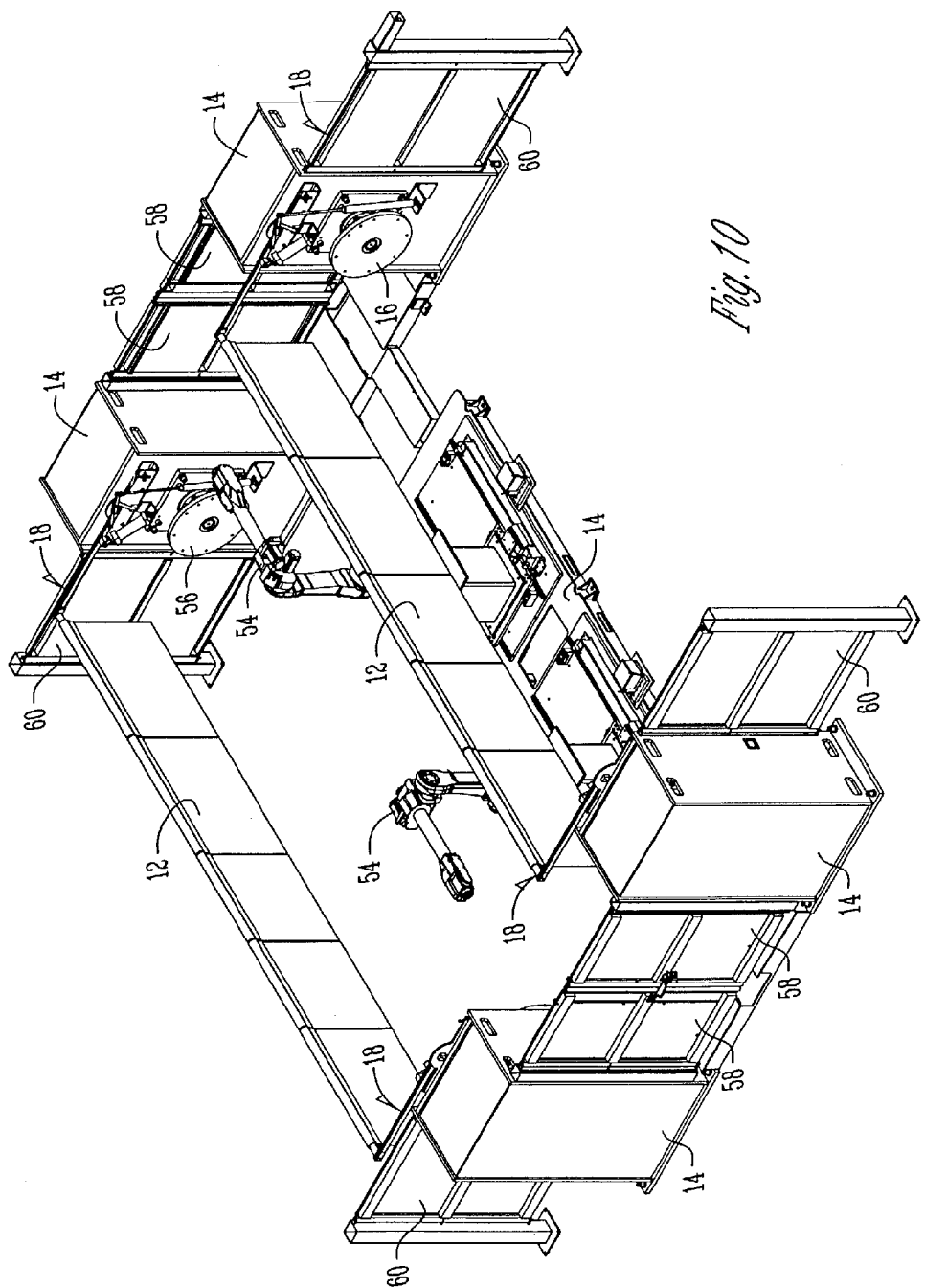
FIG. 10 is a perspective view of a workstation with a second workpiece holder between a first and second flash guard.

As seen in FIG. 9 and FIG. 10, an embodiment of the workstation 10 may have a second work piece holder 56 spaced apart from the first work piece holder 16. The workstation 10 would thus have two arm assembly 18 and two flash guards 12. The workstation 10 would move between a first position, as seen in FIG. 9, where the first work piece holder 16 is between first and second flash guards 12 and a second position, as seen in FIG. 10, where the second work piece holder 56 is between first and second flash guards 12. As seen in FIG. 9 and FIG. 10, this workstation 10 may also have access doors 58 and side barriers 60.

In use, the flash guard 12 is attached to the arm assembly 18. The arm assembly 18 is pivotally mounted to the frame 14 and can be rotated from a first position to a second position about a first work piece holder 16. The user then pivots the arm assembly 18 from the first position to the second position. The workstation may also utilize a second flash guard 12 that the user may pivot in unison with the first flash guard from a first position to a second position about a second work piece holder 56.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing form the spirit or scope of the invention as further defined in the following claims.

What is claimed is:

1. A workstation comprising:
   a support frame;
   a flash guard;
   an arm supporting said flash guard and being pivotally mounted to said support frame for pivotal movement about an arm axis from a first position to a second position;
   linkage mechanism pivotally interconnecting said arm and said support frame;
   an extensible power member connected to said support frame and to said linkage mechanism, said power member being movable from a retracted position holding said arm in said first position to an extended position to move said arm to said second position.

2. A workstation according to claim 1 wherein said arm pivots more than 180 degrees between said first and said second positions.

3. A workstation according to claim 1 wherein said linkage mechanism includes first, second and third links pivotally connected to one another.

4. A workstation according to claim 3 wherein said first link is also pivotally connected to said arm, said second link is also pivotally connected to said support frame, and said third link is also pivotally connected to said extensible power member.

5. A workstation according to claim 1 further comprising a balancing mechanism connected to said support frame and to said second arm.

6. A workstation according to claim 1 further comprising a second arm supporting said flash guard and being pivotally connected to said support frame for movement between first and second positions.

7. A workstation according to claim 6 further comprising a second balancing mechanism connected to said support frame and to said arm.

8. A workstation according to claim 6 further comprising a robot mounted to said support frame; a work piece holder on said support frame for supporting a work piece adjacent said robot, said flash guard being on one side of said work piece holder when in said first position and being on said other side of said work piece holder when in said second position.

9. A workstation comprising:
   a support frame:
   an arm assembly comprising first and second spaced apart arms and a cross bar extending there between;
   a flash guard sheet member detachably connected to said cross bar;
   a first work piece holder on said support frame;
   a robot mounted on said support frame adjacent said first work piece holder;
   said arm assembly being mounted on said support frame for movement from a first position wherein said flash guard is on a first side of said work piece holder to a second position wherein said flash guard is on a second side of said work piece holder opposite from said first side.

10. A workstation according to claim 9 further comprising a second work piece holder spaced from said first work piece holder, a second arm assembly and a second flash guard sheet member attached to said second arm assembly; said second arm assembly being mounted to said support frame for movement between first and second positions respectively, said first work piece holder being between said first and second flash guard sheet members when said first and second arm assemblies are in their first positions, and said second work piece holder being between said first and second flash guard sheet members when said first and second arm assemblies are in their second positions.

11. A method for providing a flash guard comprising:
    attaching a first flash guard sheet member to a first arm assembly pivotally mounted to a support frame;
    pivoting said arm assembly from a first position wherein said flash guard sheet member is on a first side of a first work piece holder to a second position wherein said flash guard sheet member is on a second side of said first work piece holder opposite from said first side.

12. A method according to claim 11 further comprising attaching a second flash guard sheet member to a second arm assembly pivotally mounted to said support frame and pivoting said second arm assembly from a first position to a second position, said first and second flash guard sheet members being on opposite sides of said first work piece holder when in their respective first positions and being on opposite sides of a second work piece holder when in their respective second positions.

13. A method according to claim 11 wherein a robot is mounted to said support frame adjacent said first work piece holder, said method further comprising detaching said first flash guard sheet member from said first arm assembly so as to gain access to said robot for servicing said robot.

14. A method according to claim 13 further comprising performing a robotic function on a work piece mounted on said work piece holder.

* * * * *

UNITED STATES PATENT AND TRADEMARK OFFICE
CERTIFICATE OF CORRECTION

PATENT NO. : 6,891,128 B1
DATED : May 10, 2005
INVENTOR(S) : Sidlinger, Matthew R. et al.

It is certified that error appears in the above-identified patent and that said Letters Patent is hereby corrected as shown below:

Column 6,
Line 2, should read -- a balancing mechanism connected to said support --

Signed and Sealed this

Second Day of August, 2005

JON W. DUDAS
*Director of the United States Patent and Trademark Office*